United States Patent [19]

James

[11] Patent Number: 5,700,228
[45] Date of Patent: Dec. 23, 1997

[54] GYROCYCLE

[76] Inventor: Miro James, 4503 Kinmount Rd., Lanham, Md. 20706

[21] Appl. No.: 553,858

[22] Filed: Nov. 6, 1995

[51] Int. Cl.$^6$ .............................. A63B 22/12; B62M 1/06
[52] U.S. Cl. .................. 482/62; 482/57; 482/61; 280/233
[58] Field of Search ..................... 482/57, 62, 63, 482/61; 472/21; 280/200, 210, 211, 214, 226.1, 230, 233, 234, 282, 267

[56] References Cited

U.S. PATENT DOCUMENTS

| | | | |
|---|---|---|---|
| 1,453,046 | 4/1923 | Gabke | 280/267 |
| 4,152,005 | 5/1979 | Vanore | 280/234 |
| 4,423,863 | 1/1984 | Figueroa | 482/62 |
| 4,436,097 | 3/1984 | Cunningham | 482/63 X |
| 4,508,358 | 4/1985 | Erel | 280/233 X |
| 4,639,007 | 1/1987 | Lawrence | 482/57 X |

FOREIGN PATENT DOCUMENTS

| | | | |
|---|---|---|---|
| 2830691 | 1/1980 | Germany | 482/57 |
| 19568 | of 1894 | United Kingdom | 280/234 |

*Primary Examiner*—Richard J. Apley
*Assistant Examiner*—William LaMarca
*Attorney, Agent, or Firm*—Michael I. Kroll

[57] ABSTRACT

A gyrocycle (10) comprising an elongated main body (12). A pair of front wings (14) extend from the main body (12). A pair of rear wings (16) extend from the main body (12). A front axle (18) extends transversely through the main body (12) and through the front wings (14). A rear axle (20) extends transversely through the main body (12) and through the rear wings (16). A pair of front wheels (22) are provided. Each front wheel (22) is mounted in a rotatable manner to one end of the front axle (18), so that the front wheels (22) can rest upon a flat horizontal surface (24). A pair of rear wheels (26) are also provided. Each rear wheels (20) is mounted in a rotatable manner to one end of the rear axle (20), so that the rear wheels (26) can rest upon the flat horizontal surface (24). A chair (28) is mounted onto the main body (12) adjacent the rear wings (16), so that a person (30) can sit in the chair (28). A facility (32) is built into the main body (12) for exercising, so that the person (30) sitting in the chair (28) can strengthen the triceps, biceps and abdominal muscles.

23 Claims, 3 Drawing Sheets

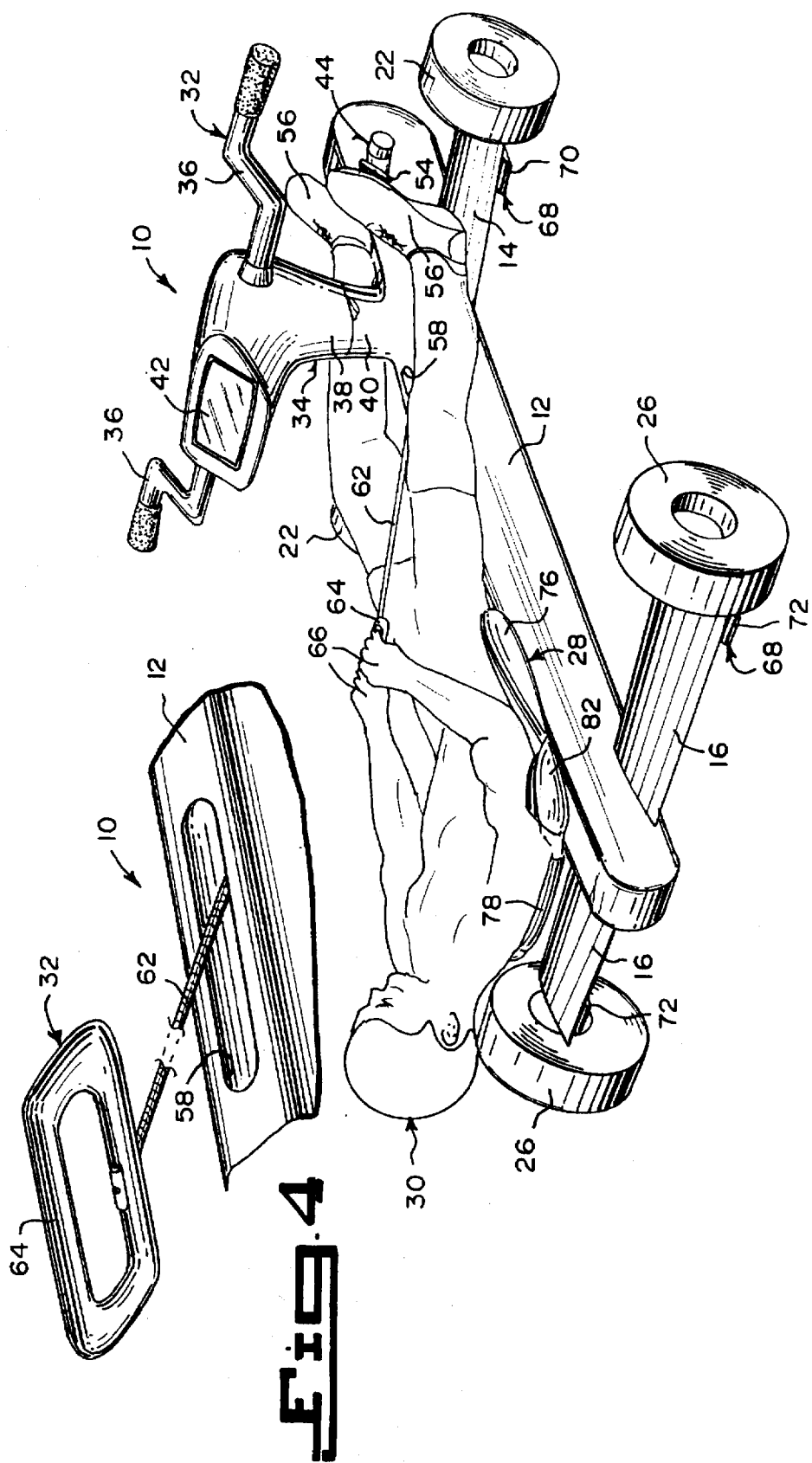

GYROCYCLE

BACKGROUND OF THE INVENTION

1. Field of the Invention

The instant invention relates generally to exercise equipment and more specifically it relates to a gyrocycle.

2. Description of the Prior Art

Numerous exercise equipment have been provided in prior art that are adapted to improve muscle development through isotonic exercises. While these units may be suitable for the particular purpose to which they address, they would not be as suitable for the purposes of the present invention as heretofore described.

SUMMARY OF THE INVENTION

A primary object of the present invention is to provide a gyrocycle that will overcome the shortcomings of the prior art devices.

Another object is to provide a gyrocycle that allows a person sitting thereon to perform a sit-up exercise, so as to increase abdominal strength, which will help tone and flatten the stomach.

An additional object is to provide a gyrocycle that contains a handgrip connected to a built-in retractable pull cord, so that the person can sit in a reclined position to perform a simulated rowing exercise, which will also strengthen the triceps, biceps and abdominal muscles.

A further object is to provide a gyrocycle that is simple and easy to use.

A still further object is to provide a gyrocycle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 3 is a perspective view showing a person sitting in a reclined position and doing a simulated rowing exercise.

FIG. 4 is an enlarged perspective view of an area in FIG. 1 indicated by arrow 4, showing the handgrip and retractable pull cord extended from the main body.

Similar reference characters denote corresponding features consistently throughout the attached drawings.

DETAILED DESCRIPTION OF THE PREFERRED EMBODIMENTS

Figure 1:
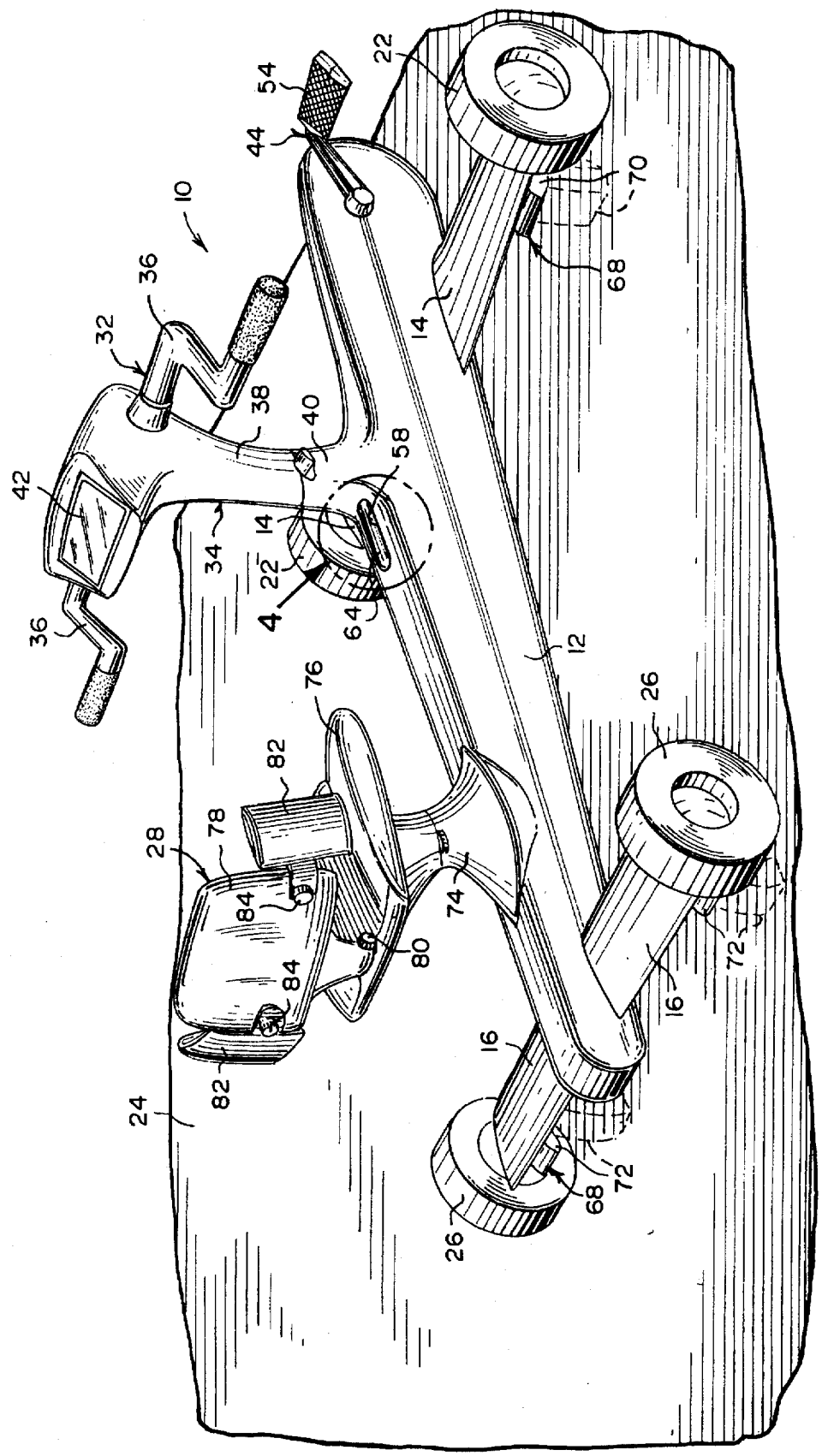
FIG. 1 is a perspective view of the instant invention placed upon a floor.

Turning now descriptively to the drawings, in which similar reference characters denote similar elements throughout the several views, FIGS. 1 through 4 illustrate a gyrocycle 10 comprising an elongated main body 12. A pair of front wings 14 extend from the main body. 12. A pair of rear wings 16 extend from the main body 12. A front axle 18 extends transversely through the main body 12 and through the front wings 14. A rear axle 20 extends transversely through the main body 12 and through the rear wings 16. A pair of front wheels 22 are provided. Each front wheel 22 is mounted in a rotatable manner to one end of the front axle 18, so that the front wheels 22 can rest upon a flat horizontal surface 24.

A pair of rear wheels 26 are also provided. Each rear wheel 26 is mounted in a rotatable manner to one end of the rear axle 20, so that the front wheels 26 can rest upon the flat horizontal surface 24. A chair 28 is mounted onto the main body 12 adjacent the rear wings 16, so that a person 30 can sit in the chair 28. A facility 32 is built into the main body 12 for exercising, so that the person 30 sitting in the chair 28 can strengthen the triceps, biceps and abdominal muscles.

The exercising facility 32 includes a stanchion 34 on the main body 12 adjacent the front wings 14. A pair of handlebars 36 are connected in a rotatable manner into the stanchion 34, so that the person 30 sitting in the chair 28 can grip the handlebars 36 and rotate them to build up the tricep muscles. The stanchion 34 consists of an upper section 38 that swivels upon a lower section 40, so that the handlebars 36 can be turned to the left and to the right by the person 30 sitting in the chair 28. The stanchion 34 also includes a control station display 42, so that the person sitting the chair 38 can monitor visually how to exercise.

Figure 2:
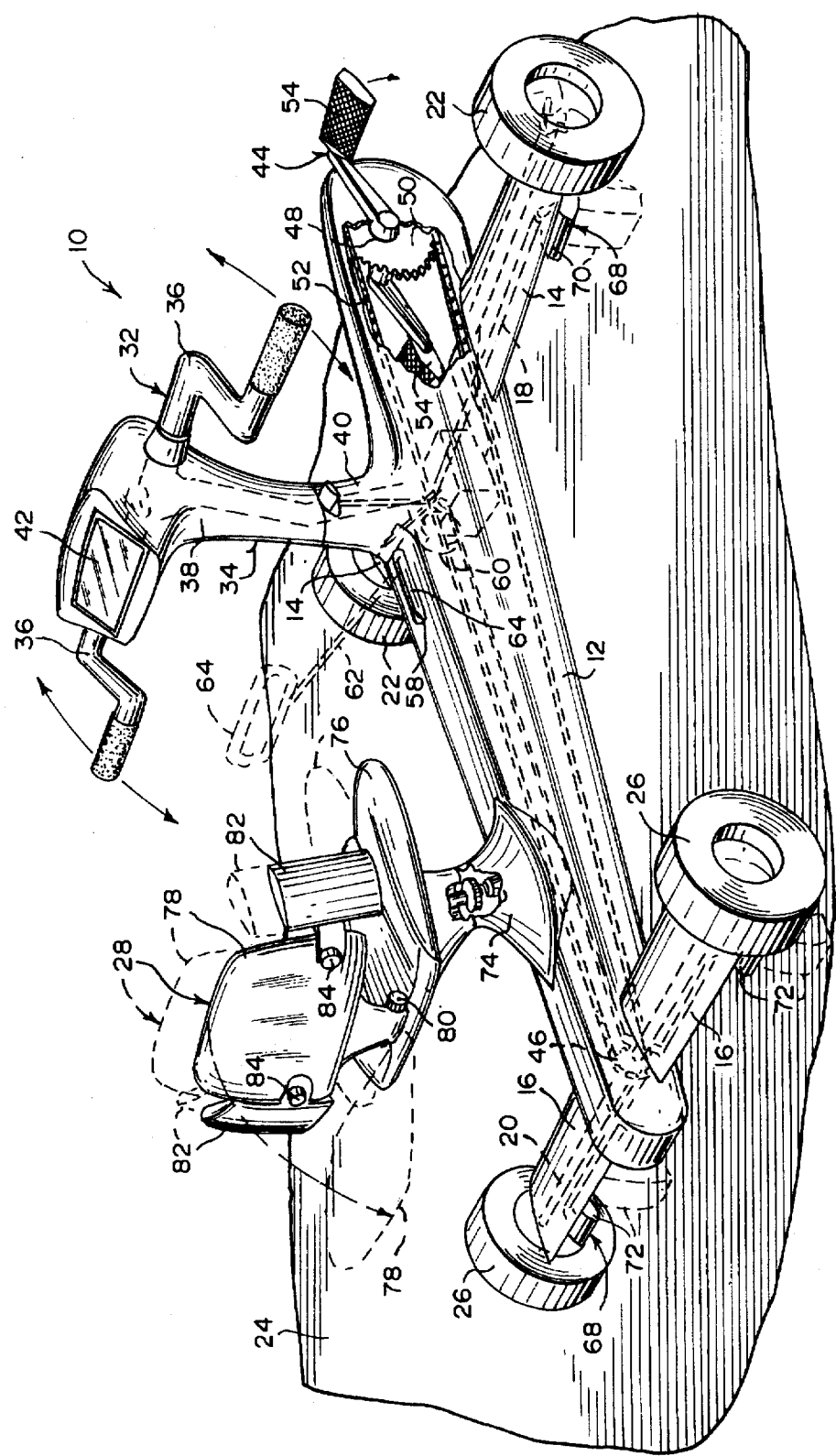
FIG. 2 is a perspective view similar to FIG. 1, showing parts broken away, in section and in phantom.

The exercise facility 32 further contains a manual drive assembly 44 to rotate the rear axle 20 and turn the rear wheels 26, so as to propel the main body 12 forward and rearward along the flat horizontal surface 24. The manual drive assembly 44, as best seen in FIG. 2, includes a rear drive sprocket 46 on the rear axle 20 in a rearward end of the main body 12. A crank axle 48 is in a forward end of the main body 12. A front drive sprocket 50 is on the crank axle 48. A continuous chain 52 extends between the rear drive sprocket 46 and the front drive sprocket 50 within the main body 12. A pair of pedals 54 are connected to the crank axle 48, so that the person 30 sitting in the chair 28 can operate the pedals 54 with the feet 56, as shown in FIG. 3.

The main body 12 having a top slot 58 is spaced forward from the chair 28. A pulley 60 is mounted in a rotatable manner within the main body 12 below the top slot 58. A retractable pull cord 62 on the pulley 60 extends through the top slot 58. A handgrip 64 is on a distal free end of the retractable pull cord 62. The person 30 sitting in the chair 28 can grasp the handgrip 64 by the hands 66 and pull back to simulate a rowing exercise (see FIG. 3).

Components 68 are for elevating the front wheels 22 and the rear wheels 26 off of the flat horizontal surface 24, so as to keep the main body 12 in a stationary position upon the flat horizontal surface 24. The components 68 consist of a pair of front folding braces 70. Each front folding brace 70 is pivotally mounted to the underside of one front wing 14 adjacent one front wheel 22. When the front folding braces 70 are manually folded down, the front wheels 22 will be lifted up off of the flat horizontal surface 24. A pair of rear folding braces 72 are also provided. Each rear folding brace 72 is pivotally mounted to the underside of one rear wing 16 adjacent one rear wheel 26. When the rear folding braces 72 are manually folded down, the rear wheels 26 will be lifted up off of the flat horizontal surface 24.

The chair 28 includes a pedestal 74 on the main body 12. A seat 76 is supported on the pedestal 74. A backrest 78 extends up from the seat 76. The pedestal 74 is height adjustable to raise and lower the seat 76 and the backrest 78, so as to accommodate different sized people who might sit in the chair 28. The seat 76 is contoured to add comfort thereto, when the person 30 sits on the seat 76.

The backrest 78 is padded to add comfort thereto, when the person 30 sits in the chair 28. The backrest 78 is attached at 80 to the seat 76 in a reclining manner, so that when the person 30 sits on the seat 76, the person 30 can lean backward to exercise. A pair of side pads 82 are also provided. Each side pad 82 is affixed at 84 in a detachable manner to the backrest 78 to add additional support and comfort to the person 30, when sitting in the chair 28.

LIST OF REFERENCE NUMBERS 10 gyrocycle
12 elongated main body of 10
14 front wing of 10
16 rear wing of 10
18 front axle of 10
20 rear axle of 10
22 front wheel of 10
24 flat horizontal surface
26 rear wheel of 10
28 chair of 10
30 person in 28
32 exercising facility of 10
34 stanchion of 32
36 handlebar of 32
38 upper section of 34
40 lower section of 34
42 control station display on 34
44 manual drive assembly of 32
46 rear drive sprocket of 44
48 crank axle of 44
50 front drive sprocket of 44
52 continuous chain of 44
54 pedal of 44
56 foot of 30
58 top slot in 12
60 pulley of 32
62 retractable pull cord of 32
64 handgrip of 32
66 hand of 30
68 elevating component
70 front folding brace of 68
72 rear folding brace of 68
74 pedestal of 28
76 seat of 28
78 backrest of 28
80 reclining attachment of 78 to 76
82 side pad
84 detachable fastener of 82 to 78

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A gyrocycle comprising:
   a) an elongated main body;
   b) a pair of front wings extending from said main body;
   c) a pair of rear wings extending from said main body;
   d) a front axle extending transversely through said main body and through said front wings;
   e) a rear axle extending transversely through said main body and through said rear wings;
   f) a pair of front wheels, in which each said front wheel is mounted in a rotatable manner to one end of said front axle, so that said front wheels can rest upon a flat horizontal surface;
   g) a pair of rear wheels, in which each said rear wheel is mounted in a rotatable manner to one end of said rear axle, so that said front wheels can rest upon the flat horizontal surface;
   h) a chair mounted onto said main body adjacent said rear wings, so that a person can sit in said chair;
   i) means built into said main body for exercising, so that the person sitting in said chair can strengthen the triceps, biceps and abdominal muscles; and
   j) means for elevating said front wheels and said rear wheels off of the flat horizontal surface, so as to keep said main body in a stationary position upon the flat horizontal surface, said elevating means including:
      i) a pair of front folding braces, in which each said front folding brace is pivotally mounted to the underside of One said front wing adjacent one said front wheel, so that when said front folding braces are folded down, said front wheels will be lifted up off of the flat horizontal surface; and
      ii) a pair of rear folding braces, in which each said rear folding brace is pivotally mounted to the underside of one said rear wing adjacent one said rear wheel, so that when said rear folding braces are folded down said rear wheels will be lifted up off of the flat horizontal surface.

2. A gyrocycle as recited in claim 1, wherein said exercising means includes:
   a) a stanchion on said main body adjacent said front wings; and
   b) a pair of handlebars connected in a rotatable manner into said stanchion, so that the person sitting in said chair can grip said handlebars and rotate them to build up the tricep muscles.

3. A gyrocycle as recited in claim 2, wherein said stanchion includes an upper section that swivels upon a lower section, so that said handlebars can be turned to the left and to the right by the person sitting in said chair.

4. A gyrocycle as recited in claim 2, wherein said stanchion includes a control station display, so that the person sitting in said chair can monitor visually how to exercise.

5. A gyrocycle as recited in claim 1, wherein said exercise means includes a manual drive assembly to rotate said rear axle and turn said rear wheels, so as to propel said main body forward and rearward along the flat horizontal surface.

6. A gyrocycle as recited in claim 5, wherein said manual drive assembly includes:
   a) a rear drive sprocket on said rear axle in a rearward end of said main body;

b) a crank axle in a forward end of said main body;

c) a front drive sprocket on said crank axle;

d) a continuous chain extending between said rear drive sprocket and said front drive sprocket within said main body;

e) a pair of pedals connected to said crank axle, so that the person sitting in said chair can operate said pedals with the feet.

7. A gyrocycle as recited in claim 1, wherein said exercising means includes:

a) said main body having a top slot spaced forward from said chair;

b) a pulley mounted in a rotatable manner within said main body below said top slot;

c) a retractable pull cord on said pulley, which extends through said top slot; and d) a handgrip on a distal free end of said retractable pull cord, so that the person sitting in said chair can grasp said handgrip by the hands and pull back to simulate a rowing exercise.

8. A gyrocycle as recited in claim 1, wherein said chair includes:

a) a pedestal on said main body;

b) a seat supported on said pedestal; and c) a backrest extending up from said seat.

9. A gyrocycle as recited in claim 8, wherein said pedestal is height adjustable to raise and lower said seat and said backrest, so as to accommodate different sized people who might sit in said chair.

10. A gyrocycle as recited in claim 8, wherein said seat is contoured to add comfort thereto, when the person sits on said seat.

11. A gyrocycle as recited in claim 8, wherein said backrest is padded to add comfort thereto, when the person sits in said chair.

12. A gyrocycle as recited in claim 8, wherein said backrest is attached to said seat in a reclining manner, so that when the person sits on said seat, the person can lean backward to exercise.

13. A gyrocycle as recited in claim 8, further including a pair of side pads, each said side pad is affixed in a detachable manner to said backrest to add additional support and comfort to the person, when sitting in said chair.

14. A gyrocycle as recited in claim 3, wherein said stanchion includes a control station display, so that the person sitting in said chair can monitor visually how to exercise.

15. A gyrocycle as recited in claim 14, wherein said exercise means includes a manual drive assembly to rotate said rear axle and turn said rear wheels, so as to propel said main body forward and rearward along the flat horizontal surface.

16. A gyrocycle as recited in claim 15, wherein said manual drive assembly includes:

a) a rear drive sprocket on said rear axle in a rearward end of said main body;

b) a crank axle in a forward end of said main body;

c) a front drive sprocket on said crank axle;

d) a continuous chain extending between said rear drive sprocket and said front drive sprocket within said main body;

e) a pair of pedals connected to said crank axle, so that the person sitting in said chair can operate said pedals with the feet.

17. A gyrocycle as recited in claim 16, wherein said exercising means includes:

a) said main body having a top slot spaced forward from said chair;

b) a pulley mounted in a rotatable manner within said main body below said top slot;

c) a retractable pull cord on said pulley, which extends through said top slot; and d) a handgrip on a distal free end of said retractable pull cord, so that the person sitting in said chair can grasp said handgrip by the hands and pull back to simulate a rowing exercise.

18. A gyrocycle as recited in claim 16, wherein said chair includes:

a) a pedestal on said main body;

b) a seat supported on said pedestal; and c) a backrest extending up from said seat.

19. A gyrocycle as recited in claim 18, wherein said pedestal is height adjustable to raise and lower said seat and said backrest, so as to accommodate different sized people who might sit in said chair.

20. A gyrocycle as recited in claim 19, wherein said seat is contoured to add comfort thereto, when the person sits on said seat.

21. A gyrocycle as recited in claim 20, wherein said backrest is padded to add comfort thereto, when the person sits in said chair.

22. A gyrocycle as recited in claim 21, wherein said backrest is attached to said seat in a reclining manner, so that when the person sits on said seat, the person can lean backward to exercise.

23. A gyrocycle as recited in claim 22, further including a pair of side pads, each said side pad is affixed in a detachable manner to said backrest to add additional support and comfort to the person, when sitting in said chair.

* * * * *